United States Patent
Kumar et al.

(10) Patent No.: US 8,588,204 B2
(45) Date of Patent: Nov. 19, 2013

(54) EFFICIENT CHANNEL ESTIMATION METHOD USING SUPERIMPOSED TRAINING FOR EQUALIZATION IN UPLINK OFDMA SYSTEMS

(75) Inventors: R. V. Raja Kumar, West Bengal (IN); Jinesh P. Nair, West Bengal (IN)

(73) Assignee: The Indian Institute of Technology, Kharagpur, Kharagpur (IN)

( * ) Notice: Subject to any disclaimer, the term of this patent is extended or adjusted under 35 U.S.C. 154(b) by 801 days.

(21) Appl. No.: 12/705,574

(22) Filed: Feb. 13, 2010

(65) Prior Publication Data
US 2010/0322225 A1 Dec. 23, 2010

(30) Foreign Application Priority Data
Feb. 13, 2009 (IN) .............................. 261/KOL/2009

(51) Int. Cl.
*H04B 7/208* (2006.01)
*H04J 1/00* (2006.01)

(52) U.S. Cl.
USPC .......................................... 370/344; 370/480

(58) Field of Classification Search
USPC ................................. 370/334, 480
See application file for complete search history.

(56) References Cited

U.S. PATENT DOCUMENTS

| | | | |
|---|---|---|---|
| 7,965,761 B2 * | 6/2011 | Shattil ........................... | 375/147 |
| 2002/0111142 A1 * | 8/2002 | Klimovitch ..................... | 455/63 |
| 2008/0287155 A1 * | 11/2008 | Xu et al. ........................ | 455/522 |
| 2009/0190634 A1 * | 7/2009 | Bauch et al. ................... | 375/211 |
| 2010/0091826 A1 * | 4/2010 | Chen et al. ..................... | 375/224 |
| 2010/0296436 A1 * | 11/2010 | Kwon et al. ................... | 370/328 |
| 2011/0007829 A1 * | 1/2011 | Kumar et al. .................. | 375/260 |

* cited by examiner

*Primary Examiner* — Brandon Renner
*Assistant Examiner* — Faisal Choudhury
(74) *Attorney, Agent, or Firm* — The Law Office of Michael E. Kondoudis

(57) ABSTRACT

The present invention relates to channel estimation in uplink OFDMA systems and in particular to an efficient channel estimation method involving superimposed training for equalization in uplink OFDMA systems. The method is also directly applicable to the uplink in important linearly precoded versions of OFDMA like SC-FDMA. Importantly, the invention provides for the first time iterative time domain least squares based channel estimation method of superimposed training based uplink OFDMA/SC-FDMA wherein the training sequence for such channel estimation is optimal in terms of BER minimization. Hence the method according to the present invention is of improved accuracy and is well suited for practical implementation. The method of the invention can have wide application in various wireless communication systems and enabled devices, cellular systems, handheld devices, computers, PDAs and cell phones and the like.

10 Claims, 3 Drawing Sheets

Figure 1:
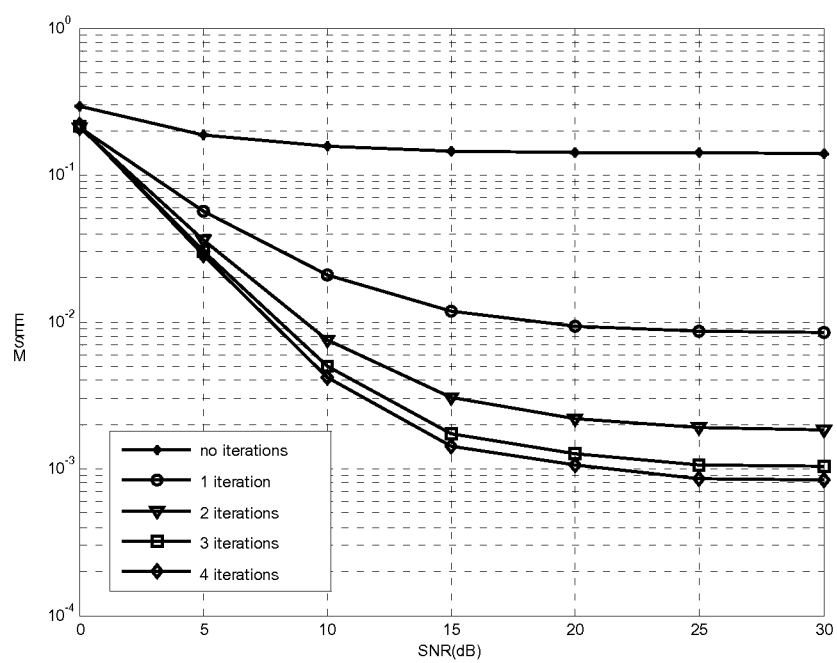

EFFICIENT CHANNEL ESTIMATION METHOD USING SUPERIMPOSED TRAINING FOR EQUALIZATION IN UPLINK OFDMA SYSTEMS

CROSS-REFERENCE TO RELATED APPLICATION

This application claims the benefit of Indian Patent Application No. 261/KOL/2009, which was filed on Feb. 13, 2009.

FIELD OF THE INVENTION

This invention relates to channel estimation in uplink OFDMA systems and in particular to an efficient channel estimation method involving superimposed training for equalization in uplink OFDMA systems. The method is also directly applicable to the uplink in important linearly pre-coded versions of OFDMA like SC-FDMA. Importantly, the invention provides for the first time iterative time domain least squares based channel estimation method of superimposed training based uplink OFDMA/SC-FDMA wherein the training sequence for such channel estimation is optimal in terms of BER minimization. Hence the method according to the present invention is of improved accuracy and is well suited for practical implementation. The method of the invention can have wide application in various wireless communication systems and enabled devices, cellular systems, handheld devices, computers, PDAs and cell phones and the like.

BACKGROUND ART

Orthogonal Frequency Division based Multiple Access (OFDMA) and its versions like SC-FDMA is finding its way in to many of the modern high data rate communication standards like the IEEE 802.16e/m, IEEE 802.22 and also 3GPP-LTE and LTE-Advanced as the preferred multiple access scheme.

Channel estimation in the uplink in such systems is a challenging task as the received time domain signal is the superimposition of the signals from the multiple users. From this composite signal it is required to estimate the channel coefficients between each pair of transmitter and receiver. Conventionally this is done by making use of pilots. These methods give good performance at the cost of a significant loss in bandwidth efficiency of the system. This loss is severe in a time varying frequency selective fading channel in uplink OFDMA scenarios as the number of users increase. This is because, the number of pilots required to identify all the user channels each with many impulse response coefficients is very high. Hence there is a strong need for bandwidth efficient channel estimation in such systems with acceptable performance.

In recent times, superimposed training (ST) based techniques have been tried out for channel estimation in single carrier, OFDMA and multiple input multiple output (MIMO) systems. In these schemes, training symbols known to the receiver are algebraically added on to the data at a low power, thus avoiding the need for additional time slots for training. At the receiver these known symbols, in the presence of unknown data and noise, are used for channel estimation. These methods for channel estimation are highly attractive compared to pilot assisted techniques as they are bandwidth efficient.

In view of the above reasons ST based methods are attractive for channel estimation. Moreover, the existing literature does not report on any ST based method suitable for application in uplink OFDMA systems so far. Also, there is a strong need for arriving at optimal ST sequences in these systems also.

[Provide brief description of the prior art literatures sl. 1-5 as mentioned in the first technical input, highlighting the disadvantage or limitations of each of the related art vis-à-vis the distinguishing features of the present invention]

In "Channel Estimation for OFDMA Uplink: a Hybrid of Linear and BEM Interpolation Approach," IEEE Transactions on Signal Processing, vol. 55, no. 4, pp. 1568-1573, April 2007 by Yi Ma, and Tafazolli, R., the channel for each subband is modeled by combing the linear and Fourier basis-expansion functions. Based on this mode, a two-dimensional interpolation approach is proposed for the channel estimation, which is investigated in terms of estimation error and pilot placement. This is a pilot based method and is bandwidth inefficient and is computationally expensive. Moreover, no description is provided on the optimality of the sequences.

"Maximum Likelihood synchronization and channel estimation for OFDMA uplink transmissions," IEEE Transactions on Communications, vol. 54, no. 4, pp. 726-736, April 2006 by Pun M. O, Morelli M, and Kuo C. J, discloses an alternating projection based method to solve the carrier frequency synchronization, timing synchronization and channel estimation problem as an alternative to the computationally complex search based maximum likelihood solution.

"Asymptotically efficient reduced complexity frequency offset and channel estimators for uplink MIMO-OFDMA systems," IEEE Trans. on Signal Processing, vol. 56, no. 3, pp. 964-973, March 2008 by S. Sezginer, and P. Bianchi, addresses the joint data-aided estimation of frequency offsets and channel coefficients in uplink MIMO-OFDMA systems. The method again is based on time multiplexed training and hence is bandwidth inefficient.

"Parametric Channel Estimation for Pseudo-Random Tile-Allocation in Uplink OFDMA," IEEE Transactions on Signal Processing, vol. 55, no. 11, pp. 5370-5381, November 2007 by Raghavendra M. R., Lior, E., Bhashyam, S., and Giridhar, K propose a parametric channel estimation method applicable to irregular and sparsely spaced pilots, that does not exhibit an error-_floor over the nominal operating range of signal to noise ratios, even for highly selective channels. The proposed algorithm exploits the pilot structure in each tile in estimating the delay subspace corresponding to the parametric channel description.

"Line search based iterative joint estimation of channels and frequency offsets for uplink OFDMA systems," IEEE Trans on Wireless Communications, vol. 6, no. 12, pp. 4374-4388, December 2007 by Y. Na, and H. Minn proposes a novel iterative joint estimation of channels and frequency offsets for uplink OFDMA systems. The proposed method is based on the iterative line search algorithm with a trust region. The objective function minimizes the mean-square distance between the received vector and the reconstructed received vector based on the estimated parameters.

S. Zhou, G. B. Giannakis, and A. Scaglione, "Long codes for generalized FH-OFDMA through unknown multipath channels," IEEE Trans. on Communications, vol. 49, no. 4, pp. 721-730, April 2001 discloses a host of blind channel estimation algorithms are developed trading off complexity with performance. However the methods suffer from the problems of slow convergence and bandwidth inefficiency.

OBJECTS OF THE INVENTION

It is thus the basic object of the present invention to provide for an efficient channel estimation method using superimposed training for equalization in uplink OFDMA systems adapted to ensure improved bandwidth efficiency in multi-user environment and frequency selective fading nature of channel.

Another object of the present invention is directed to said efficient channel estimation method using superimposed training for equalization in uplink OFDMA systems wherein iterative time domain least square channel estimation method is used for multi-carrier systems with significant improvement in performance.

A further object of the present invention is directed to said efficient channel estimation method using superimposed training for equalization in uplink OFDMA systems wherein the iterative estimator provides scope for exploiting the available coherence time and the coherence bandwidth of the channel in a computationally efficient manner.

A still further object of the present invention is directed to said efficient channel estimation method using superimposed training for equalization in uplink OFDMA systems wherein said method ensures improved accuracy and is well suited for practical implementation.

A still further object of the present invention is directed to said efficient channel estimation method using superimposed training for equalization in uplink OFDMA systems wherein training sequence used for the channel estimation method is optimal in terms of minimizing the BER of the users.

A still further object of the present invention is directed to said efficient channel estimation method using superimposed training for equalization in uplink OFDMA systems wherein the method is best suited for creating a separate engine suitable for computing the channel estimate by a separate processor element outside the OFDMA modulator and demodulator and thus favouring its practical implementation.

A still further object of the present invention is directed to said efficient channel estimation method using superimposed training for equalization in uplink OFDMA systems wherein the Bit Error Rate (BER) is used as the criterion for making the choice of ST based training sequence for uplink OFDMA systems.

A still further object of the present invention is directed to said efficient channel estimation method using superimposed training for equalization in uplink OFDMA systems wherein proposed ST based sequence significantly reduces the error floor in the BER in the first stage of the iterative process favor achieving desired performance along with band width efficiency.

A still further object of the present invention is directed to said efficient channel estimation method using superimposed training for equalization in uplink OFDMA systems wherein lesser number of iterations are required to achieve a target BER avoiding computational complexity.

A still further object of the present invention is directed to said efficient channel estimation method using superimposed training for equalization in uplink OFDMA systems wherein chirp based training sequences are proposed whereby the sequence for each user offers a uniform interference in all the data sub-carriers of that user that considerably improves the bit error rate performance of the system.

A still further object of the present invention is directed to said efficient channel estimation method using superimposed training for equalization in uplink OFDMA/SC-FDMA systems wherein the proposed method is applicable with all the sub-carrier allocation schemes namely interleaved, distributed and contiguous allocation and said method is applicable with the other sequences like the PN sequences and other periodic sequences generally used for channel estimation.

A still further object of the present invention is directed to Wireless communication systems and enabled devices comprising particularly concerning high data rate systems including WiMax, IEEE802.20, IEEE802.16m cellular systems including 4G cellular systems including LTE and LTE-Advanced adapted to use the efficient superimposed training based channel estimation method for equalization in uplink OFDMA/SC-FDMA systems.

SUMMARY OF THE INVENTION

Thus according to the basic aspect of the present invention there is provided a superimposed training (ST) based channel estimation method for equalization in uplink OFDMA/SC-FDMA systems adapted to ensure improved performance and higher bandwidth efficiency, comprising
an iterative time domain least squares based channel estimation involving superimposed training sequences based uplink OFDMA/SC-FDMA;
using available coherence time and coherence bandwidth of the channel in a computationally efficient manner involving an estimator;
bit error rate (BER) used as the criterion for the choice of the training sequence for ST based OFDMA/SC-FDMA;
a chirp based training sequence with uniform energy in all the subcarriers being added to the data adapted to minimizing the bit error rate (BER);
said sequence providing for reducing the error floor in the BER in the first stage of iterative process for achieving desired performance and bandwidth efficiency reducing the computational complexity; and
reducing the data interference in the channel estimate in each iteration of the estimator involving interference canceller.

Another aspect of the present invention is directed to said superimposed training (ST) based channel estimation method for equalization in uplink OFDMA systems wherein, the data symbol associated with the set of subcarriers is assigned to an user and the frequency domain vectors associated with said user of a OFDMA symbol are formed and passed through the IDFT block, a training sequence associated with said user is then algebraically added to this IDFT output with a specific low pilot to data power ratio to form the said vector for the user and transmitted over a time varying frequency selective fading channel.

A further aspect of the present invention is directed to said superimposed training (ST) based channel estimation method for equalization in uplink OFDMA systems, wherein said optimal training sequence assigned to the $t^{th}$ user in an uplink OFDMA system is $$c_t(k) = IDFT_N\left\{DFT_N\left[e^{j\frac{2\pi n}{N}(Q(t-1)+\frac{n}{2}+1)}\right] \times W_t(k)\right\},$$

$$n = 0, 1, \ldots N-1, t = 1, 2, \ldots N_t$$

where n denotes the nth element of the vector, Q is the order of the channel estimator, N is the number of subcarriers, $N_t$ stands for the number of users and DFT and IDFT stands for the discrete Fourier transform and the inverse DFT respectively and $W_t(k)$ is the user dependant mask defined as $$W_t(k) = \begin{cases} 1, & k \in \{\Psi_t\}, t \in [1, N_t] \\ 0, & k \notin \{\Psi_t\} \end{cases}$$

A still further aspect of the present invention is directed to a superimposed training (ST) based channel estimation method for equalization in uplink OFDMA/SC-FDMA systems wherein said method is of improved accuracy and well suited for practical implementation that exploits the communication channel encountered in practice.

Importantly in said superimposed training (ST) based channel estimation method for equalization in uplink OFDMA/SC-FDMA systems according to the invention, wherein the sequence for each user offers a uniform interference in all the data subcarriers of that user and thus improving the bit error rate performance of the system.

Also in said superimposed training (ST) based channel estimation method for equalization in uplink OFDMA/SC-FDMA systems, wherein approximation to the optimum training sequence is used with an associated loss in performance.

A still further aspect of the present invention is directed to a superimposed training (ST) based channel estimation method for uplink OFDMA/SC-FDMA systems wherein said sequence is generalized to include all the sub-carrier allocations such as the interleaved, distributed and also the contiguous allocation depending on the way the user dependent mask $W_r(k)$ is defined.

A still further aspect of the present invention is directed to said superimposed training (ST) based channel estimation method for uplink OFDMA/SC-FDMA systems wherein said method is applicable with other sequences like the PN sequences and other periodic sequences used for channel estimation.

According to yet another aspect of the present invention is directed to a superimposed training (ST) based channel estimation method for equalization in uplink OFDMA systems, wherein the channel impulse response estimate for any iteration is determined by minimizing the least squares difference between the received signal and the out put of the sum of the ST sequence and the detected symbols of the previous iteration passed through the channel estimator.

A still further aspect of the present invention is directed to a superimposed training (ST) based channel estimation method for equalization in uplink OFDMA systems, wherein the stopping criterion for the iterative scheme depends on the allowable system complexity and latency and the required estimation accuracy.

According to yet another aspect of the present invention is directed to Wireless communication systems and enabled devices comprising:
means for superimposed training (ST) based channel estimation method for equalization in uplink OFDMA/SC-FDMA systems adapted to ensure improved performance and higher bandwidth efficiency involving the channel estimation method of the invention.

Advantageously, said Wireless communication systems and enabled devices comprise particularly concerning high data rate systems including WiMax, IEEE802.20, IEEE802.16m cellular systems including 4G cellular systems including LTE and LTE-Advanced.

Thus the superimposed training (ST) based channel estimation method for equalization in uplink OFDMA/SC-FDMA systems as of the present invention is adapted to ensure improved performance and higher bandwidth efficiency and wireless communication systems, enabled devices, cellular devices handheld devices, computers PDAs and cell phones involving the same.

The present invention and its objects and advantages are described in greater details with reference to the following accompanying non limiting illustrative drawings.

BRIEF DESCRIPTION OF THE ACCOMPANYING FIGURES

Figure 2:
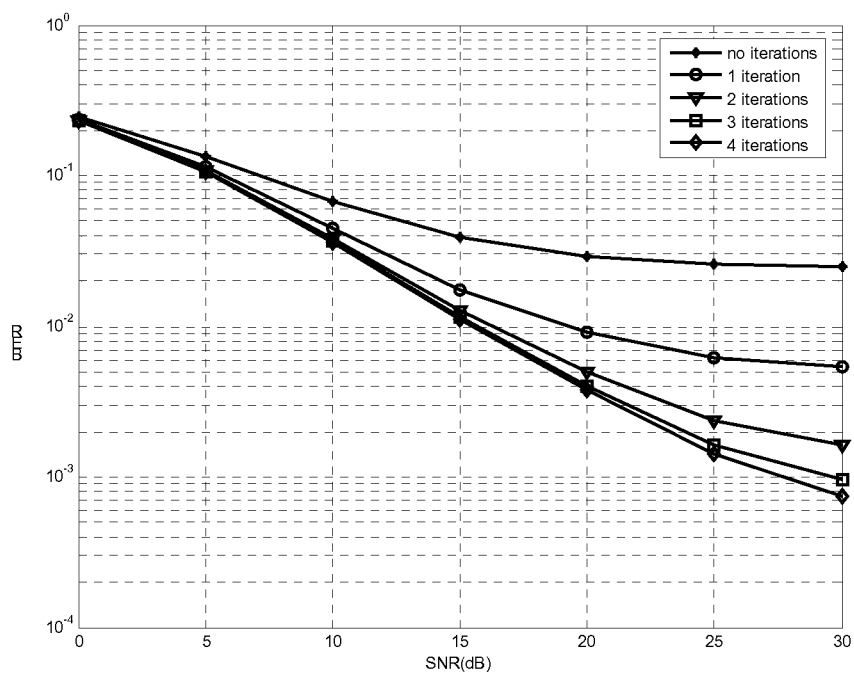

FIG. 1: illustrates the Simulated MSEE vs. SNR performance using the proposed sequences for the Uplink OFDMA system;

FIG. 2: illustrates the Simulated BER vs. SNR performance using the proposed sequences for the Uplink OFDMA system.

Figure 3:
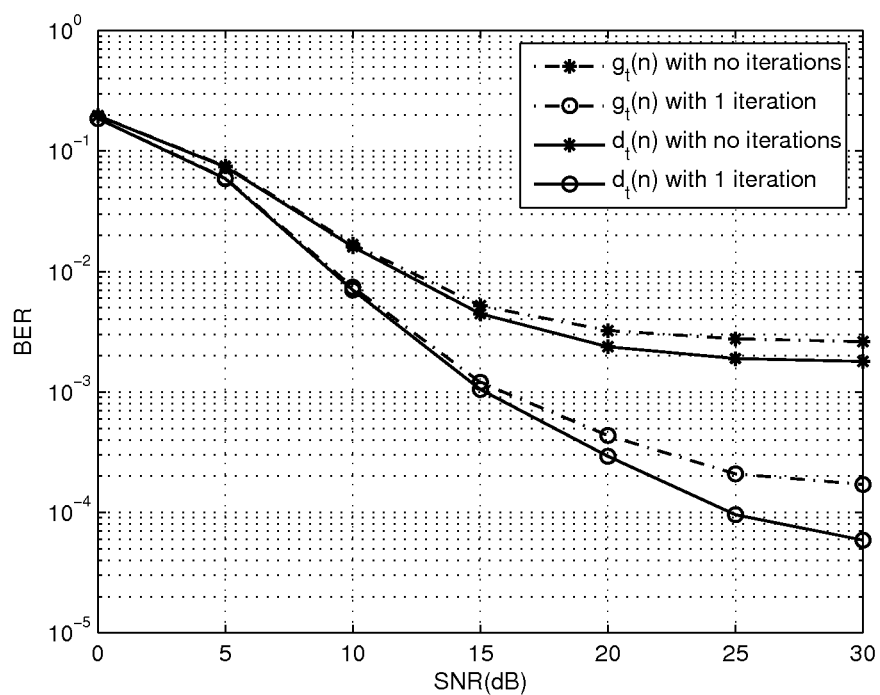

FIG. 3: illustrates the Simulated BER vs. SNR comparison between the proposed sequences $c_r(k)$ and the sequences $g_r(k)$ [as defined and described in the following paragraphs] for the Uplink OFDMA system.

DETAILED DESCRIPTION OF THE INVENTION WITH REFERENCE TO THE ACCOMPANYING FIGURES

The present invention is directed to a superimposed training based channel estimation method including a novel training sequence is proposed for uplink OFDMA systems. An iterative time domain least squares based channel estimation method is proposed. The estimator is generalized to provide scope for exploiting the available coherence time and the coherence bandwidth of the channel in a computationally efficient manner. Hence the method is of improved accuracy and is well suited for practical implementation. Very importantly, chirp based training sequences are proposed for such systems. The sequence for each user offers fairness through providing a uniform interference in all the data subcarriers of that user. This considerably improves the bit error rate performance of the system.

The objects and advantages of the invention and its manner of implementation shall be clearly under stood from the following detailed description:

Performance of Superimposed Training Based OFDMA System:

In this section the performance of the proposed method along with the proposed training sequences for the uplink interleaved OFDMA system is presented. The channel model used was the International Telecommunication Union Vehicular Channel A (ITUV-A) with a maximum mobility support of 36 Km/Hr (from $f_{dmax}$). The sequence used is the one proposed in (3). The mean square estimation error (MSEE) and bit error rate (BER) performance improvement with iterations has been illustrated in the accompanying FIG. 1 and FIG. 2 respectively.

The significant improvement in the MSEE and BER with the number of iterations is clearly evident in FIG. 1 and FIG. 2 respectively, albeit with diminishing return. In FIG. 1, it is observed that in spite of consuming no bandwidth for channel estimation, a BER of $1 \times 10^{-3}$ is achieved at an signal to noise ratio (SNR) of 26 dB with four iterations. Hence the proposed scheme is attractive for consideration in scenarios as mentioned in the simulation parameters. As the number of users, mobility and delay spread of the channel increases the pilot assisted method needs to sacrifice more bandwidth to track the channel variations and ensure channel identifiability. In another way, there is a severe performance loss associated with the pilot assisted methods with a fixed pilot density in high mobility and high delay spread scenarios and in such cases, the performance of the superimposed training based method outperforms the pilot assisted methods in addition to providing the bandwidth efficiency. Hence the method is an excellent alternative to the pilot assisted methods in such scenarios.

Optimal Training Sequences

Next we compare the BER performance of the proposed sequences $c_t(k)$ that jointly optimize the MSEE and the BER with the sequences $g_t(k)$ that minimize the MSEE in the channel estimate only. The Stanford University Interim (SUI) 1 channel modified to incorporate a higher Doppler frequency of 100 Hz was used and the number of users considered was $N_t=4$. The remaining parameters used were identical to the simulation parameters mentioned above. $g_t(k)$ is given by $$g_t(k) = e^{j\frac{2\pi n(t-1)}{N}} e^{j\frac{2\pi n}{Q}(\frac{n}{2}+1)}, t \in [1, N_t], n = 0, 1, \ldots, N-1$$

The improved BER performance by employing the proposed sequences $c_t(k)$ as compared to $g_t(k)$ is evident. The proposed sequences have equal energy components on all the subcarriers allocated to a user. Hence the proposed sequences $c_t(k)$ offer fairness through providing a uniform lower interference in all the data subcarriers of the user. This is unlike $c_t(k)$ which results in a strong interference in a few data subcarriers of the user severely affecting the overall BER of the subcarriers. As a result, the proposed sequences $c_t(k)$ give a superior error floor performance in the BER as can be observed in FIG. 3. At an SNR of 25 dB, there is an improvement of 1.5 dB in the BER error floor performance when the proposed training sequence is used. With one iteration, the BER improves significantly by 3 dB. This result clearly strengthens the claim on the superiority of the proposed training sequences $c_t(k)$ as compared to sequences minimizing the MSEE alone.

The System

Let there be $N_t$ users transmitting data to the base station in an uplink OFDMA system. Let $\Psi_t$ be the set of subcarriers assigned to the $t^{th}$ user. The data symbol $S_{t,j}(k)$ associated with the $j^{th}$ subcarrier may be assigned to the $t^{th}$ user as follows, $$S_{t,j}(k) = \begin{cases} D_{t,j}(k), & j \in \Psi_t, D_{t,j} \in \{\pm a \pm jb\} \\ 0, & j \notin \Psi_t \end{cases} \quad (1)$$

Here a,b depends on the level of Quadrature Amplitude Modulation (QAM) modulation used.

Frequency domain vectors $\bar{s}_t(k)$ associated with the $t^{th}$ user of the $k^{th}$ OFDMA symbol are formed and passed through the IDFT block. The output of the IDFT block is $s_t(k)=F^H\bar{s}_t(k)$, where F is the normalized N×N DFT matrix with $F(m,n)=1/\sqrt{N}e^{-j2\pi mn/N}$ and $F^H$ is the complex conjugate transpose. Here (m,n) is used to denote the mth row and nth column of the matrix. A parallel to serial converter serially outputs the simultaneous IDFT outputs. A training sequence $c_t(k)$ associated with the $t^{th}$ user is then algebraically added to this IDFT output with a specific low pilot to data power ratio to get, $$x_t(k) = s_t(k) + c_t(k) \quad (2)$$

A characteristic of the invention is the training sequence that is added to the data. These are chirp based sequences with uniform energy in all the subcarriers assigned to the $t^{th}$ user in an uplink OFDMA system.

$$c_t(k) = IDFT_N\left\{DFT_N\left[e^{j\frac{2\pi n}{N}(Q(t-1)+\frac{n}{2}+1)}\right] \times W_t(k)\right\}, \quad (3)$$

$$n = 0, 1, \ldots N-1, t = 1, 2, \ldots N_t$$

Here n denotes the nth element of the vector. Q is the order of the channel estimator described later. $W_t(k)$ is the user dependant mask defined as $$W_t(k) = \begin{cases} 1, & k \in \{\Psi_t\}, t \in [1, N_t] \\ 0, & k \notin \{\Psi_t\} \end{cases} \quad (4)$$

These sequences are found to be most suitable in terms of minimizing the BER. In the existing art the superimposed training sequences appropriate for channel estimation in uplink OFDMA systems is not addressed. Approximations of this sequence may be used with an associated loss in performance. The sequence generalized to include all the subcarrier allocations namely the interleaved, distributed and also the contiguous allocation depending on the way $W_t(k)$ is defined.

Vectors $x_t(k)$ are formed for each of the $N_t$ users. These are then transmitted over a time varying frequency selective fading channel. The coherence time of the channel extends beyond one OFDMA symbol and also the delay spread of the channel is small compared to the OFDMA symbol duration. Such channels are encountered in most of the high data rate wireless communications systems in practice. The received time domain signal at the base station is a combination of the signals arriving from the different users after passing through the associated channels.

At the base station the equivalent base-band vectors due to the $N_t$ users, obtained after guard removal from the OFDMA symbols may then be expressed as $$y_r(k) = \sum_{t=1}^{N_t} [S_t(k) + C_t(k)]h_{t,r}(k) + w_r(k) \quad (5)$$

$$= \sum_{t=1}^{N_t} H_{t,r}(k)[s_t(k) + c_t(k)] + w_r(k)$$

Here $w_r(k)$ is the AWGN associated with the $k^{th}$ vector and $H_{t,r}(k)$ is the channel Toeplitz matrix with dimensions N×N. Here $S_t(k)$ and $C_t(k)$ are Toeplitz matrices of the data and training respectively associated with the users having dimensions N×L and $h_{t,r}(k)$ is the L×1 length channel vector. Here L is related to the delay spread of the channel.

An iterative estimator $^i\hat{h}_{t,r}(k)$ described later is used to estimate the channel. The received vectors are input to the DFT block for demodulation and $\bar{y}_r(k) = Fy_r(k)$ is obtained.

$$^i\hat{\bar{h}}_{t,r}(k) = F^i\hat{h}_{t,r}(k)$$

is then multiplied with $\bar{c}_t(k) = Fc_t(k)$ which is known to the receiver. These are then subtracted from $\bar{y}_r(k)$ to reduce the effect of the interference due to the training sequence on the data symbols. The frequency domain output is now given by $$^i\bar{z}_r(k) = \sum_{t=1}^{N_t}\left[^i\bar{H}_{t,r}(k)\bar{s}_t(k) + \left(^i\bar{H}_{t,r}(k) - ^i\hat{\bar{H}}_{t,r}(k)\right)\bar{c}_t(k)\right] + \bar{w}_r(k) \quad (6)$$

where $$^i\bar{H}_{t,r}(k) = \text{diag}[^iH_{tr,0}(k) \ldots ^iH_{tr,N-1}(k)]$$

and $$^i\hat{\bar{H}}_{t,r}(k) = \text{diag}[^i\hat{H}_{tr,0}(k) \ldots ^i\hat{H}_{tr,N-1}(k)]$$

are diagonal matrices with diagonal entries being the frequency coefficients of the channel and their estimates respectively, $$\bar{c}_t(k) = F c_t(k) = [C_{t,0}(k) \ldots C_{t,N-1}(k)]^T$$

and $$\bar{w}_r(k) = F w_r(k) = [W_{r,0}(k) \ldots W_{r,N-1}(k)]^T.$$

At the receiver, since the subcarriers of the users are disjoint form each other, the summation found in (5) can be discarded at the subcarrier level. Hence, the received signal at the $j^{th}$ subcarrier of the $t^{th}$ user is given by, $$^i Z_{r,j}(k) = H_{tr,j}(k)[S_{t,j}(k) + C_{t,j}(k)] - {}^i \hat{H}_{tr,j}(k) C_{t,j}(k) + W_{r,j}(k), \quad j \in \Psi_t \quad (7)$$

Decisions are taken on $^i Z_{r,j}$ and $^i \hat{S}_{r,j}$ is obtained. These are used to form $$^i \hat{s}_t(k)$$

which are then presented to the other blocks of a communication receiver. These may also be used in the iterative channel estimation scheme described next.

The Iterative Data Aided Channel Estimator

Composite vectors are formed to help formulating the proposed system. Let $^i \hat{h}_r$ be an $N_t Q \times 1$ composite channel vector associated with each receive antenna for the $i^{th}$ iteration, made up of the channel estimation vectors $^i \hat{h}_{t,r}^T, t \in [1, N_t]$ with dimension $Q \times 1$ associated with each of the users and the $r^{th}$ receive antenna. Hence we have $$^i \hat{h}_r = [{}^i \hat{h}_{1,r}^T \, {}^i \hat{h}_{2,r}^T \ldots {}^i \hat{h}_{N_t,r}^T]_{N_t Q \times 1}^T \quad (8)$$

Here $Q \geq L$ is the order of the estimators. This should be no lesser than the delay spread of the channel to ensure channel identifiability and as close to L as possible for improved estimation accuracy. Also $N \geq N_t Q$ in order to ensure unique LS channel estimates.

Also, $C(k)$ is the composite training sequence matrix obtained by stacking the Toeplitz matrices of the training sequences from all the users. $C_t(k), t \in [1, N_t]$ with dimension $N \times (Q \geq L)$ is used to form the block matrix $$[C(k)]_{N \times N_t Q} = [C_1(k) C_t(k) \ldots C_{N_t}(k)] \quad (9)$$

The channel impulse response estimate $^i \hat{h}_r$ for the $i^{th}$ iteration is determined by minimizing the least squares difference between the received signal and the output of the sum of the ST sequence and the detected symbols of the previous iteration passed through the channel estimator. This is obtained as $$^i \hat{h}_r = \left( \sum_{k=0}^{T_p - 1} {}^i C(k)^{Hi} C(k) \right)^{-1} \left( \sum_{k=0}^{T_p - 1} {}^i C(k)^H y_r(k) \right) \quad (10)$$

Here $^i C(k)$ for each iteration is defined as $$^i C(k) = {}^{i-1} \hat{S}(k) + C(k) \quad (11)$$

Here $[^i \hat{S}(k)]_{N \times N_t Q}$ is defined as $$^i \hat{S}(k) = \begin{cases} [^i \hat{S}_1(k) \, {}^i \hat{S}_2(k) \ldots {}^i \hat{S}_{N_t}(k)], & i \geq 1 \\ 0, & i = 0 \end{cases} \quad (12)$$

The elements $[^i \hat{S}_t(k)]_{N \times Q}$ are the matrices obtained from the time domain vector of the detected symbols $$^i \hat{s}_t(k) = F^{-1} {}^i \hat{S}_t(k),$$

refer Sec. 1, after equation (7). Similarly the reduced interference output for each iteration is modified in a straightforward as in (6) and (7).

The stopping criterion for the iterative scheme depends on the allowable system complexity and latency and the required estimation accuracy.

The estimator is advantageous as it is generalized to provide scope for exploiting the coherence time and the coherence bandwidth of the channel in each iteration in a computationally efficient manner. The method is highly attractive as compared to the pilot based methods in view of the bandwidth efficiency inherent to ST based methods. This is especially true in OFDMA systems due to the multiple users and the frequency selective fading nature of the channel. Moreover, the method is better suited for creating a separate engine suitable for computing the channel estimate by a separate processor element outside the OFDM modulator and demodulator. All these advantages make the proposed method well suited for practical implementation.

The proposed method is applicable with all the subcarrier allocation schemes namely interleaved, distributed and contiguous allocation. Moreover, the proposed method is applicable with the other sequences like the PN sequences and other periodic sequences generally used for channel estimation.

With the use of the proposed method and the proposed sequence a performance comparable to pilot assisted methods can be obtained for medium delay spread channels and low mobility. Furthermore for high delay spread channels and high mobility scenarios the performance of the proposed ST scheme can outperform the pilot assisted methods. This happens when the pilot assisted methods with a fixed pilot density is insufficient to track the channel variations and ensure channel identifiability. Such a problem does not arise in the proposed invention as the ST sequences are always present along with the data. Hence the invention is an excellent substitute to the pilot based methods for modern and next generation communication systems wherein the channels encountered typically have a high delay spread and demands a very high mobility support.

Equations (1), (3), (6), (7) (10) and (11) constitutes the iterative TD LS based channel estimation method for the uplink OFDMA system. Equation (3) and (4) are the proposed training sequences for uplink OFDMA systems.

Performance Testing of the System and Method:

The present invention involved experimental studies carried out to study the performance of the proposed scheme and its comparison with existing schemes minimizing the MSEE alone are presented. The MSEE and the BER simulation results presented are obtained by averaging over an ensemble of 1000 Monte Carlo iterations. In order to benchmark against the uncoded system performance, channel coding is not considered here. Each subcarrier uses quadrature phase shift keying QPSK modulation and the number of subcarriers used is N=1024. The BER in this section refers to the average BER per user. The simulation parameters as given below are akin to the IEEE 802.16e scenario with a limited mobility is used.

Simulation Parameters:
$f_c$ (Center frequency)=3 GHz
BW (Channel bandwidth)=10 MHz $f_s$ (Signal sampling rate)=11.52 MHz
$f_{dmax}$ (Maximum Doppler frequency)=100 Hz
CP (Cyclic prefix)=32 samples
Q (Order of the estimator)=14 samples
$T_p$ (Number of OFDM symbols used for channel estimation)= 8 symbols
α (Data to pilot power ratio)=12
$N_t$ (Number of Users)=8

An equivalent pilot assisted scheme typically assigns 8 pilots per user (since Q=8) for channel estimation. The ST based method assigns none. Hence, there is a considerable saving in the bandwidth efficiency of the uplink OFDMA system when the ST based method is used. It has been observed that the bandwidth efficiency for this example improves by 6.25% (8/128) as compared to an equivalent pilot assisted method.

It is thus possible by way of the present invention to developing a method for channel estimation with desired efficiency using superimposed training based sequence for multicarrier OFDMA systems adapted to achieve the following distinct merits and advantages:

1) The iterative time domain least squares based channel estimation method for superimposed training based uplink OFDMA is proposed for the first time and hence is novel.
2) The training sequence for the above mentioned channel estimation method is optimal unlike in the other existing superimposed methods and is novel.
3) The channel estimation method exploits the communication channel encountered in practice in an innovative manner to deal with the data interference in the channel estimate. The method provides flexibility in the design to suit the different channel characteristics encountered in different environments/standards.
4) The method includes an interference canceller that reduces the data interference in the channel estimate of the estimator. This is done in each iteration of the estimator.
5) The bit error rate is used as the criterion while making the choice of the proposed training sequence. The training sequences that may be used for ST based uplink OFDMA systems is not addressed in the existing art.

Advantages:
1) The use of the proposed iterative estimator is advantageous as the performance can be significantly improved in addition to providing the bandwidth efficiency advantage of superimposed training based systems. This is especially true in OFDMA systems due to the multiple users and the frequency selective fading nature of the channel.
2) The method is better suited for creating a separate engine suitable for computing the channel estimate by a separate processor element outside the OFDM modulator and demodulator. All these advantages make the proposed method well suited for practical implementation.
3) The use of the proposed sequence significantly reduces the error floor in the BER in the first stage of the iterative process and yields a performance which is nearly equal to that of the pilot based methods, but with an added advantage of band width efficiency. Hence a lesser number of iterations are required to achieve a target BER as compared to other sequences. Hence use of the sequence reduces the computational complexity.

The system and method of the invention thus are capable to providing an efficient iterative time domain least squares based method for channel estimation with a characteristic superimposed training based sequence added to the data which are chirp based sequences with uniform energy in all the subcarriers assigned to each user in an uplink OFDMA/SC-FDMA system. As discussed the proposed invention is an excellent substitute to the pilot based methods for modern and next generation communication systems wherein the channels encountered typically have a high delay spread and demands a very high mobility support. The system and method of the invention is thus capable of wide scale industrial application in wireless communication systems and enabled devices, particularly concerning high data rate systems such as WiMax, IEEE802.16m and other 4G cellular systems like LTE-Advanced favouring efficiency, improved accuracy and cost effective communication with optimum training sequence and minimum error.

What is claimed is:

1. A superimposed training (ST) based channel estimation method involving a chirp based training sequence for equalization in uplink OFDMA systems adapted to perform free of pilot assistance and ensure improved performance and higher bandwidth efficiency, comprising
   an iterative time domain least squares based channel estimation involving superimposed training sequences based uplink OFDMA/SC-FDMA;
   using available coherence time and coherence bandwidth of the channel in a computationally efficient manner involving an estimator;
   bit error rate (BER) used as the criterion for the choice of optimal chirp based training sequence for ST based OFDMA;
   assigning data symbol associated with set of subcarriers to an user and frequency domain vectors associated with said user of a OFDMA symbol are formed and passed through-IDFT block;
   providing said optimal chirp based training sequence with uniform energy in all the subcarriers involving $$c_t(k) = IDFT_N \left\{ DFT_N \left[ e^{j\frac{2\pi n}{N}(Q(t-1)+\frac{n}{2}+1)} \right] \times W_t(k) \right\},$$
$$n = 0, 1, \ldots N-1, t = 1, 2, \ldots N_t$$

where t signifies the user, n denote the nth element of the vector, Q is the order of the channel estimator, N is the number of the subcarriers, $N_t$ stands for number of the user and $W_t(k)$ is the user dependant mask defined as $$W_t(k) = \begin{cases} 1 & , k \in \{\Psi_t\}, t \in [1, N_t] \\ 0 & , k \notin \{\Psi_t\} \end{cases}$$

added the thus obtained optimal chirp based training sequence to the IDFT output for minimizing the bit error rate (BER);
   said sequence providing for reducing the error floor in the BER in the first stage of iterative process for achieving desired performance and bandwidth efficiency reducing the computational complexity; and
   reducing the data interference in the channel estimate in each iteration of the estimator involving interference canceller.

2. The superimposed training (ST) based channel estimation method for equalization in uplink OFDMA systems according to claim 1, wherein said method is of improved accuracy and well suited for practical implementation that exploits the communication channel encountered in practice.

3. The superimposed training (ST) based channel estimation method for equalization in uplink OFDMA systems according to claim 1, wherein the sequence for each user offers a uniform interference in all the data subcarriers of that user and thus improving the bit error rate performance of the system.

4. The superimposed training (ST) based channel estimation method for equalization in uplink OFDMA systems according to claim 1, wherein approximation to the optimum training sequence is used with an associated loss in performance.

5. The superimposed training (ST) based channel estimation method for uplink OFDMA systems according to claim 1, wherein said sequence is generalized to include all the sub-carrier allocations such as the interleaved, distributed and also the contiguous allocation depending on the way the user dependent mask $W_t(k)$ is defined.

6. The superimposed training (ST) based channel estimation method for uplink OFDMA systems according to claim 1 wherein said method is applicable with other sequences like the PN sequences and other periodic sequences used for channel estimation.

7. The superimposed training (ST) based channel estimation method for equalization in uplink OFDMA systems according to claim 1, wherein the channel impulse response estimate for any iteration is determined by minimizing the least squares difference between the received signal and the out put of the sum of the ST sequence and the detected symbols of the previous iteration passed through the channel estimator.

8. The superimposed training (ST) based channel estimation method for equalization in uplink OFDMA systems according to claim 1, wherein the stopping criterion for the iterative scheme depends on the allowable system complexity and latency and the required estimation accuracy.

9. A wireless communication system and enabled device comprising:
uplink OFDMA or SC-OFDMA system adapted to perform free of pilot assistance and ensure improved performance and higher bandwidth efficiency having:
channel estimator for equalization in uplink OFDMA or SC-OFDMA systems involving a chirp based training sequence with uniform energy in all the subcarriers characterized by $$c_t(k) = IDFT_N\left\{DFT_N\left[e^{j\frac{2\pi n}{N}(Q(t-1)+\frac{n}{2}+1)}\right] \times W_t(k)\right\},$$
$$n = 0, 1, \ldots N-1, t = 1, 2, \ldots N_t$$

where t signifies the user, n denotes the nth element of the vector, Q is the order of the channel estimator, N is the number of the subcarriers, $N_t$ stands for number of the user and $W_t(k)$ is the user dependant mask defined as $$W_t(k) = \begin{cases} 1 & , k \in \{\Psi_t\}, t \in [1, N_t] \\ 0 & , k \notin \{\Psi_t\} \end{cases}$$

to be added with the data symbol associated with the set of subcarriers of the OFDMA or SC-OFDMA system.

10. The wireless communication system and enabled device according to claim 9 comprising particularly concerning high data rate systems including WiMax, IEEE802.20, IEEE802.16m cellular systems including 4G cellular systems including LTE and LTE-Advanced.

* * * * *